Patented June 6, 1950

2,510,495

UNITED STATES PATENT OFFICE 2,510,495

THERAPEUTIC COMPOSITIONS

Harold P. Brown, Akron, Ohio, assignor to George A. Breon & Company, Kansas City, Mo., a corporation of Missouri No Drawing. Application September 13, 1944, Serial No. 553,952

2 Claims. (Cl. 167—51.5)

This invention relates to a therapeutic composition and more particularly to a therapeutic composition containing a derivative of 2-aminothiazole.

This application is a continuation-in-part of my copending application Serial No. 388,304, filed April 12, 1941, now abandoned.

Among the objects of this invention are the provision of a therapeutic composition containing a hitherto unused derivative of 2-aminothiazole; the provision of such a derivative having therapeutic properties; the provision of a derivative of the type indicated which is effective for treatment of coccus infections; and the provision of such a derivative having a superior therapeutic index, but less toxicity than related compounds. Other objects will be in part obvious and in part pointed out hereinafter.

The invention accordingly comprises the ingredients and combinations of ingredients, the proportions thereof, and features of composition, which will be exemplified in the products hereinafter described, and the scope of the application of which will be indicated in the following claims.

According to this invention a therapeutic composition is provided containing as an essential ingredient a derivative of 2-aminothiazole having therapeutic properties, namely, 2-(p - nitrobenzenesulfonamido)-thiazole. This compound has been found to be effective as an agent for the treatment of various infections caused by cocci and particularly the genus streptococcus. It has also been found beneficial in the treatment of ulcerative colitis. Furthermore, it has been found to be effective against certain types of dysentery organisms. This compound has hitherto not been used in therapeutic compositions, although I have found that it possesses a therapeutic index superior to 2-(p-aminobenzenesulfonamido) - thiazole, sulfanilamide and other similar compounds. Contrary to the general behavior of nitrocompounds, 2-(p-nitrobenzene sulfonamido)-thiazole is less toxic than 2 - (p - aminobenzenesulfonamido)- thiazole. The therapeutic compositions which are described below may be given over a long period of time without some of the side reactions which are sometimes shown by amino compounds.

The therapeutic compositions of the present invention are in the form of compressed tablets for oral administration, aqueous suspensions for rectal administration, and a jelly base for topical application. Rectal suppositories may also be prepared.

One such composition may be readily made containing the p-nitrobenzenesulfonamido-thiazole together with sugar and starch and magnesium stearate. The p-nitrobenzenesulfonamido-thiazole may be put in a water soluble jelly base. Such gels can be prepared from methyl cellulose, plant exudates, or pectins.

The present invention will be illustrated by the use of the following specific examples, but is not to be limited thereto.

Example 1

|  | Per cent by weight |
|---|---|
| 2-(p-nitrobenzenesulfonamido)-thiazole | 70 |
| Sugar | 10 |
| Starch | 9 |
| Magnesium stearate | 6.5 |
| Talc | 4.5 |

This mixture, when properly compounded and compressed into tablets, has been found to be of therapeutic value.

The 2 - (p-nitrobenzenesulfonamido)-thiazole may be varied from 30–90% by weight, the sugar from 5–40%, the starch from 2–20%, the magnesium stearate from 2–7%, and the talc from 0–5%. Other fillers and binders known to the industry may be used to replace the sugar starch, magnesium stearate or talc.

Example 2

To a 5% starch solution is added enough 2-(p-nitrobenzenesulfonamido)-thiazole to make a 10% mixture in relation to the latter compound. The concentration of the nitrobenzenesulfonamido-thiazole can range from 1–25% to produce a therapeutically effective suspension.

Example 3

|  | Per cent by weight |
|---|---|
| 2-(p-nitrobenzenesulfonamido)-thiazole | 5 |
| Triethanolamine | 10 |
| Ethyl-p-hydroxybenzoate | 0.1 |
| Sodium sulfite | 0.2 |
| Glycerine | 10 |
| Methyl cellulose, viscosity grade 4000 C. P. S. | 3 |
| Distilled water | Remainder |

This is a water soluble jelly for topical application.

The 2 - (p-nitrobenzenesulfonamido)-thiazole may be varied from 2–25% by weight, the triethanolamine from 5–15%, the ethyl-p-hydroxybenzoate from 0.05–.25%, the sodium sulfite from 0.1–0.3%, the glycerine from 6–15%, and the methyl cellulose from 2–5%.

The 2 - (p-nitrobenzenesulfonamido)-thiazole may be incorporated in other types of therapeutic vehicles for other methods of application. For example, a nose spray may be made containing as a therapeutic ingredient 2-(p-nitrobenzenesulfonamido)-thiazole. The 2-(p-nitrobenzenesulfonamido)-thiazole may be present in proportions from 2-90% by weight of the therapeutic composition (the proportion depending upon the therapeutic effect desired).

In view of the above, it will be seen that the several objects of the invention are achieved and other advantageous results attained.

As many changes could be made in the above products without departing from the scope of the invention, it is intended that all matter contained in the above description shall be interpreted as illustrative and not in a limiting sense.

I claim:

1. A therapeutic composition of matter for treating ulcerative colitis consisting by weight of—

| | Per cent |
|---|---|
| 2-(p-nitrobenzenesulfonamido)-thiazole | 70 |
| Sugar | 10 |
| Starch | 9 |
| Magnesium stearate | 6.5 |
| Talc | 4.5 |

2. A therapeutic composition of matter for oral administration for treating ulcerative colitis, comprising by weight approximately 30–90% 2-(p-nitrobenzenesulfonamido)-thiazole, 5–40% sugar, 2–20% starch, and 2–7% magnesium stearate.

HAROLD P. BROWN.

REFERENCES CITED

The following references are of record in the file of this patent:

UNITED STATES PATENTS

| Number | Name | Date |
|---|---|---|
| 2,191,678 | Nitardy | Feb. 27, 1940 |
| 2,290,243 | Winnek | July 23, 1940 |
| 2,316,825 | Vonkennel et al. | Apr. 20, 1943 |
| 2,361,624 | Hamilton | Oct. 31, 1944 |
| 2,362,087 | Newberry | Nov. 7, 1944 |
| 2,382,167 | Hartmann et al. | Aug. 14, 1945 |

FOREIGN PATENTS

| Number | Country | Date |
|---|---|---|
| 210,425 | Switzerland | July 15, 1940 |

OTHER REFERENCES

J. A. C. S., August 1939, pages 2032 and 2033.

Jour. Amer. Chem. Soc. (Aug. 1939), vol. 61, pp. 2032–3. (Copy in Scientific Library.)

Biologie Medicale, vol. 27, Supplement 1937, pp. 74, 75, 82 to 85. (Copy in Surg. Gen. Library.)

Pub. Health Rep., July 21, 1939, page 1331. (Copy in Scien. Lib.)

"Tablet Manufacture," Wood (1904), pages 60 to 63. (Copy in Div. 43.)